United States Patent [19]

Italiano

[11] Patent Number: 5,003,837
[45] Date of Patent: Apr. 2, 1991

[54] CURVED CABLE END CONNECTOR

[75] Inventor: Anthony J. Italiano, Waukesha, Wis.

[73] Assignee: Orschlen Co., Moberly, Mo.

[21] Appl. No.: 542,765

[22] Filed: Jun. 25, 1990

[51] Int. Cl.⁵ .............................................. F16C 1/10
[52] U.S. Cl. .................. 74/501.5 R; 74/502;
 74/500.5; 403/165; 403/24
[58] Field of Search ........... 74/502.4, 502.6, 501.5 R,
 74/500.5, 502; 403/165, 24, 23

[56] References Cited

U.S. PATENT DOCUMENTS

| 3,444,701 | 5/1969 | Randolph | 74/502.5 X |
| 4,007,647 | 2/1977 | Carlson | 74/502.4 |
| 4,790,205 | 12/1988 | Stocker | 74/500.5 |
| 4,841,805 | 6/1989 | Italiano | 74/501.5 R |
| 4,892,003 | 1/1990 | Quinlan | 74/501.5 R |

Primary Examiner—Andrew V. Kundrat
Attorney, Agent, or Firm—James L. Kirschnik

[57] ABSTRACT

A curved cable end connector for providing directional changes of a flexible control cable includes a male end adapted to be rotatably locked within a female receptacle at the end of a cable conduit. The connector is formed of relatively rigid plastic material and includes an enlarged male receptacle end having resilient locking tabs formed therein for receiving a similar connector or other type of cable end connector.

12 Claims, 1 Drawing Sheet

CURVED CABLE END CONNECTOR

BACKGROUND OF THE INVENTION

1. Field of the Invention

This invention relates to end connectors or fittings for flexible control cable assemblies. Flexible control cables typically include a flexible outer conduit within which a cable or wire is axially movable. One end of the cable is typically attached to an operative member such as a control lever with the opposite end attached to a control device such as a heater door, hood release or other device in automotive applications. These devices have also found wide spread use in consumer products such as lawn mowers or snow blowers for throttle controls and other common applications.

2. Description Of The Prior Art

Control cable assemblies are often concerned with the connecting members at the terminal ends of the cable control. For example applicant's U.S. Pat. No. 4,841,805 is directed to an adjustable cable end coupling for providing adjustment of the cable travel at the end points. Similarly U.S. Pat. No. 3,444,701 to Randolph shows a curved mounting clip for providing a convenient means of attaching the ends of a flexible cable to a fixed mounting bracket. A similar curved end piece is shown in U.S. Pat. No. 4,007,647 to Carlson where a curved end member is provided for attachment of the end of the cable control. As shown by Randolph and Carlson, providing a curved terminal connector at the end of a control cable may be desired for routing purposes, and a relatively rigid curved coupling may be desired, as merely bending the cable housing could cause crimping or interference between the cable and the conduit. The prior art has not utilized a curved coupling which may be combined with other curved couplings and which are rotatable relative to each other and capable of being oriented to vary not only the degree of curvature but also the direction of curvature of the cable.

SUMMARY OF THE INVENTION

It is an object of the present invention to provide a curved cable end connector which may be snapped into place at a cable end and yet which is rotatable about the central axis of the cable whereby the direction of curve may be varied.

A further object of the invention is to provide a curved cable end connector which may be used in combination with other curved cable end connectors, all of which are rotatable relative to each other to vary the degree of curvature of the cable at the end point or which may provide bidirectional angular changes in the travel of the cable.

The foregoing objects and advantages of the present invention are provided by forming a curved cable end connector having a male end terminating in circumferentially formed axially spaced teeth in its outer surface for engaging a female receptacle having resiliently mounted internal teeth for engaging the end of said connector. The opposite end of the connector has a female end with resilient locking tabs formed therein and having tooth members for engaging the end of a connecting member. The curved connector is formed and configured so that a plurality of curved connectors may be connected together by inserting the male end of a curved connector into the female end of a similarly formed curved connector, and the use of circumferential teeth permit the curvature of the adjoining connectors to be varied by simply rotating one curved connector relative to the other.

The connectors are preferably formed from a molded relatively rigid plastic material for fixing the curvature of the cable member extending within it.

DESCRIPTION OF A PREFERRED EMBODIMENT

Figure 1:
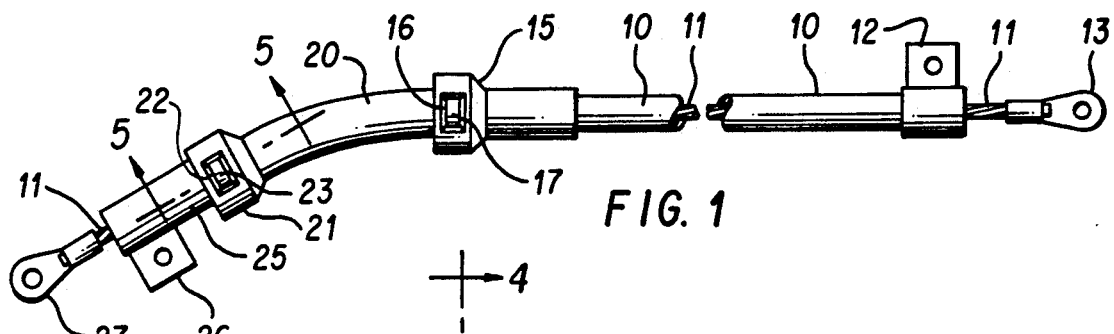
FIG. 1 is an elevational view of a flexible cable assembly utilizing a curved end member as provided by the invention.

Referring to FIG. 1, a typical flexible cable assembly is shown having an outer flexible conduit 10 containing an axially movable cable member 11 contained within it. One end of the conduit 10 may terminate in a mounting tab 12, and the cable 11 extending beyond it may have a terminal connector 13 as illustrated. The opposite end of the conduit 10 has an enlarged female receptacle portion 15 formed therein which includes a pair of diametrically opposed openings 16 formed in its outer circumference, each of which has a resilient tab 17 integrally formed with portion 15 and contained within the opening 16. A curved connector 20 is connected to the portion 15 as will be described hereinafter. The curved connector also includes an enlarged female receptacle end 21 having circumferentially formed openings 22 containing resilient tabs 23 similar to those of portion 15. An end connector 25 is shown which is engaged with the female end 21 of curved connector 20 and which may include a mounting tab 26. Cable 11 extends through the interior of the connector 20 as well as the end member 25 and may also terminate in a cable end portion 27.

Figure 2:
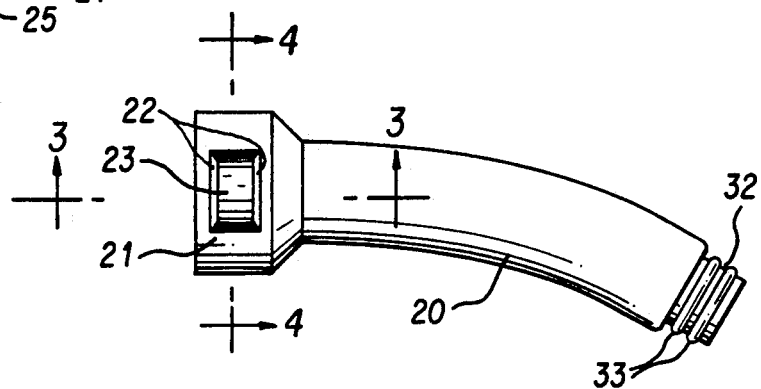
FIG. 2 is a side elevation view of a curved connector according to the invention.
Figure 3:
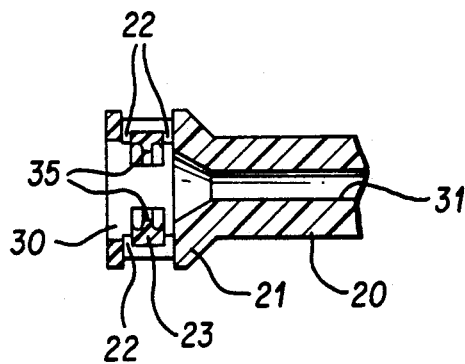
FIG. 3 is a view taken along line 3—3 of FIG. 2.
Figure 4:
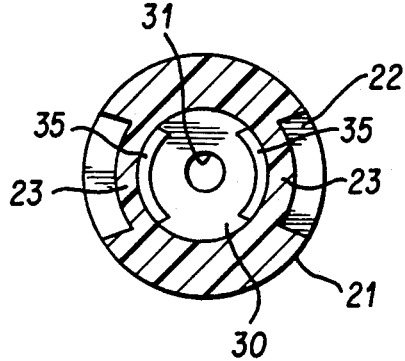
FIG. 4 is a section view taken along line 4—4 of FIG. 2.

Details of the curved connector 20 are best seen in FIGS. 2, 3, and 4. The connector 20 has a curved outer body with an enlarged female receptacle end 21 having a receiving bore 30 formed therein which joins a rearwardly spaced reduced diameter passageway 31 for receiving the cable 11. The male end 32 of connector 20 includes a plurality of circumferentially formed axially spaced ridges or teeth 33 in its outer surface. At the opposite or female end of connector 20, apertures 22 are formed on diametrically opposed portions of the outer circumference with each aperture 22 including a resilient locking tab 23 having a reduced radial thickness and also having one or more nubs or spaced teeth 35 extending radially inward into the enlarged opening bore 30.

The tubular member 20 is preferably formed by injection molding a relatively rigid plastic material such as Noryl or Acetal because of their stability under extreme temperature variations. These materials have physical characteristics such that by reducing the radial thickness of the integrally formed locking tabs 23, they will have enough flexibility to permit radial movement within the aperture 22.

Figure 5:
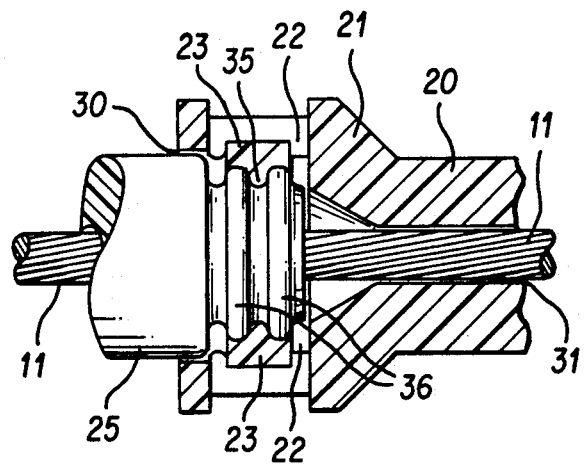
FIG. 5 is a partial section taken along line 5—5 of FIG. 1.

A detailed view of the junction between connector 20 and the connector end 25 is shown in FIG. 5. The end 20 of connector 25 is axially inserted into the female receptacle end 21. The male end of connector 25 has circumferential teeth 36 similar to the teeth 33 of connector 20, with the teeth 36 causing the resilient tabs 23 to deflect and whereby the teeth 35 of the connector 20 engage the teeth 36 to hold end connector 25 in place. The circumferential tooth configuration permits rotation of the end connector 25 relative to the curved connector 20. The apertures 16 and lock tabs 17 of the enlarged female end 15 are similarly constructed and receive male end 32 of connector 20 to engage the teeth 33 and permit connector 20 to also be rotated to direct the cable 11 to curve at any variety of positions. The female portion of the connector 20 may also receive the male end of another identical curved connector instead of end connector 25, and the curved connectors would then be rotatable relative to each other.

Those skilled in the art will appreciate that by combining two or more curved members 20, a greater degree of curvature can be provided and the rotatable connections permit directing the curvature in any desired radial path relative to the axis of the cable 11. Rotation of one curved coupling relative to another will also permit the use of compound curves. These features may be desirable in certain automotive applications, for example, to permit routing cable ends around interfering objects or changing direction of the cable movement to accommodate control locations relative to the cable assembly.

I claim:

1. A cable end coupling and flexible control cable comprising:
   a. a flexible control cable movably supported in a flexible conduit and having an end of said cable extending from an end of said conduit;
   b. said conduit end terminating in an enlarged female receptacle;
   c. A relatively rigid elongated coupling having a curved central axis and including an internal passageway extending along said curved axis for the length of said coupling for receiving and permitting movement of said cable through said coupling;
   d. said coupling including a male end means for securing said coupling to said female receptacle while permitting rotation of said coupling relative to said conduit.

2. The combination set forth in claim 1 wherein said female receptacle includes first resilient lock means for locking said male coupling end in place while permitting rotation of said coupling relative to said female receptacle.

3. The combination set forth in claim 2 wherein said coupling has an enlarged female receptacle end.

4. The combination set forth in claim 3 wherein said coupling female receptacle end includes second resilient lock means.

5. The combination set forth in claim 4 wherein said coupling male end includes one or more circumferentially oriented teeth formed therein.

6. The combination as set forth in claim 5 wherein said first resilient lock means includes one or more teeth protruding radially into the interior of said receptacle for engaging said male end member of said coupling.

7. The combination as set forth in claim 6 wherein said female receptacle of said conduit includes a peripheral side wall having one or more apertures formed therein and said lock means comprises a resilient tab contiguously formed within said aperture.

8. The combination as set forth in claim 2 wherein said resilient lock means includes one or more teeth protruding radially into the interior of said receptacle for engaging said male end member of said coupling.

9. The combination set forth in claim 1 wherein said coupling male end includes one or more circumferentially oriented teeth formed therein.

10. The combination as set forth in claim 1 wherein said female receptacle of said conduit includes a peripheral side wall having one or more apertures formed therein and said lock means comprises a resilient tab contiguously formed within said aperture.

11. A cable end coupling for use with flexible control cables comprising:
    a. an elongated relatively rigid coupling body having a curved central axis and including an internal passageway extending along said curved axis for the length of said coupling body;
    b. said coupling having a circular male end having one or more circumferentially extending teeth formed in its outer periphery;
    c. said coupling having an enlarged female opposite end having a central opening contiguous with said internal passageway;
    d. said female end portion including a peripheral side wall having at least one aperture formed therein; and,
    e. resilient lock means contiguously formed within said aperture and extending radially into the interior of said central opening for removably receiving a male end of a similar coupling.

12. A device as set forth in claim 11 wherein said lock means includes one or more teeth extending radially within said central opening and oriented generally perpendicular to said central axis.

* * * * *